(12) United States Patent
Shinto

(10) Patent No.: US 9,055,173 B2
(45) Date of Patent: Jun. 9, 2015

(54) ROTATABLE IMAGE READING APPARATUS THAT PERFORMS SHADING CORRECTION, METHOD OF CONTROLLING THE SAME, AND STORAGE MEDIUM

(71) Applicant: CANON KABUSHIKI KAISHA, Tokyo (JP)

(72) Inventor: Yasushi Shinto, Inagi (JP)

(73) Assignee: CANON KABUSHIKI KAISHA (JP)

( * ) Notice: Subject to any disclaimer, the term of this patent is extended or adjusted under 35 U.S.C. 154(b) by 14 days.

(21) Appl. No.: 13/875,433

(22) Filed: May 2, 2013

(65) Prior Publication Data
US 2013/0293934 A1 Nov. 7, 2013

(30) Foreign Application Priority Data
May 7, 2012 (JP) .................. 2012-105993

(51) Int. Cl.
*H04N 1/00* (2006.01)
*G03G 15/23* (2006.01)
*H04N 1/12* (2006.01)

(52) U.S. Cl.
CPC ......... *H04N 1/00575* (2013.01); *G03G 15/234* (2013.01); *G03G 2215/00928* (2013.01); *H04N 1/0058* (2013.01); *H04N 1/00586* (2013.01); *H04N 1/00596* (2013.01); *H04N 1/12* (2013.01); *H04N 2201/044* (2013.01); *H04N 2201/0091* (2013.01)

(58) Field of Classification Search
USPC ......... 358/1.9, 461, 498, 518, 1.12, 474, 497, 358/509, 475, 496
See application file for complete search history.

(56) References Cited

U.S. PATENT DOCUMENTS

| 7,110,148 | B2 | 9/2006 | Hasegawa et al. | |
|---|---|---|---|---|
| 7,466,457 | B2 | 12/2008 | Chen | |
| 8,054,511 | B2 | 11/2011 | Aoki et al. | |
| 8,146,919 | B2 | 4/2012 | Won | |
| 8,233,202 | B2 | 7/2012 | Chen et al. | |
| 8,320,026 | B2 * | 11/2012 | Tanaka | 358/461 |
| 8,503,040 | B2 * | 8/2013 | Suzuki | 358/474 |
| 8,643,914 | B2 * | 2/2014 | Harada | 358/475 |
| 2002/0054380 | A1 * | 5/2002 | Takeuchi et al. | 358/498 |
| 2004/0179045 | A1 * | 9/2004 | Awai et al. | 347/1 |
| 2007/0223061 | A1 * | 9/2007 | Tanaka et al. | 358/497 |
| 2010/0214583 | A1 * | 8/2010 | Suga | 358/1.9 |
| 2012/0099169 | A1 * | 4/2012 | Hyoki | 358/518 |

FOREIGN PATENT DOCUMENTS

CN 1365230 A 8/2002
CN 101247457 A 8/2008
(Continued)

OTHER PUBLICATIONS

Office Action issued in CN201310159984.3, mailed Mar. 30, 2015. English translation provided. X.

*Primary Examiner* — Allen H Nguyen
(74) *Attorney, Agent, or Firm* — Rossi, Kimms & McDowell LLP

(57) ABSTRACT

An image reading apparatus capable of efficiently performing shading correction. The image reading apparatus includes a reading unit that is rotatable for reading an original. A CPU causes the reading unit to read, while the reading unit rotates after reading an image of the original, image data for use in correction of the read image. The CPU performs the correction using the image data read by the reading unit.

9 Claims, 15 Drawing Sheets

(56) References Cited

FOREIGN PATENT DOCUMENTS

| | | |
|---|---|---|
| CN | 101378440 A | 3/2009 |
| JP | 2000-185881 A | 7/2000 |
| TW | 200640241 | 11/2006 |
| TW | 200948038 A | 11/2009 |

* cited by examiner

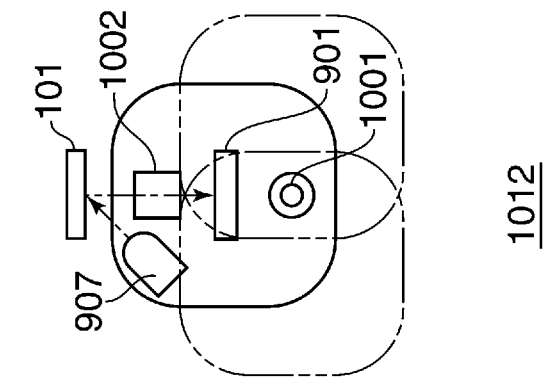
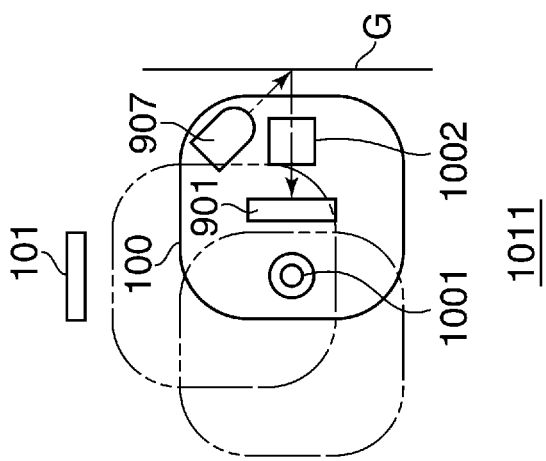
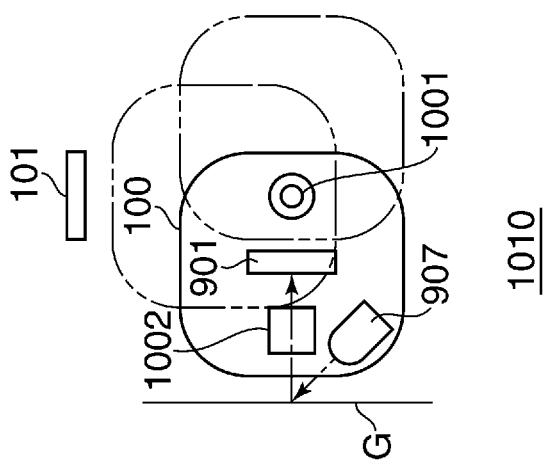

| | DIGITAL SIGNAL VALUE |
|---|---|
| WHITE SIGNAL LEVEL | 210 |
| BLACK SIGNAL LEVEL | 10 |

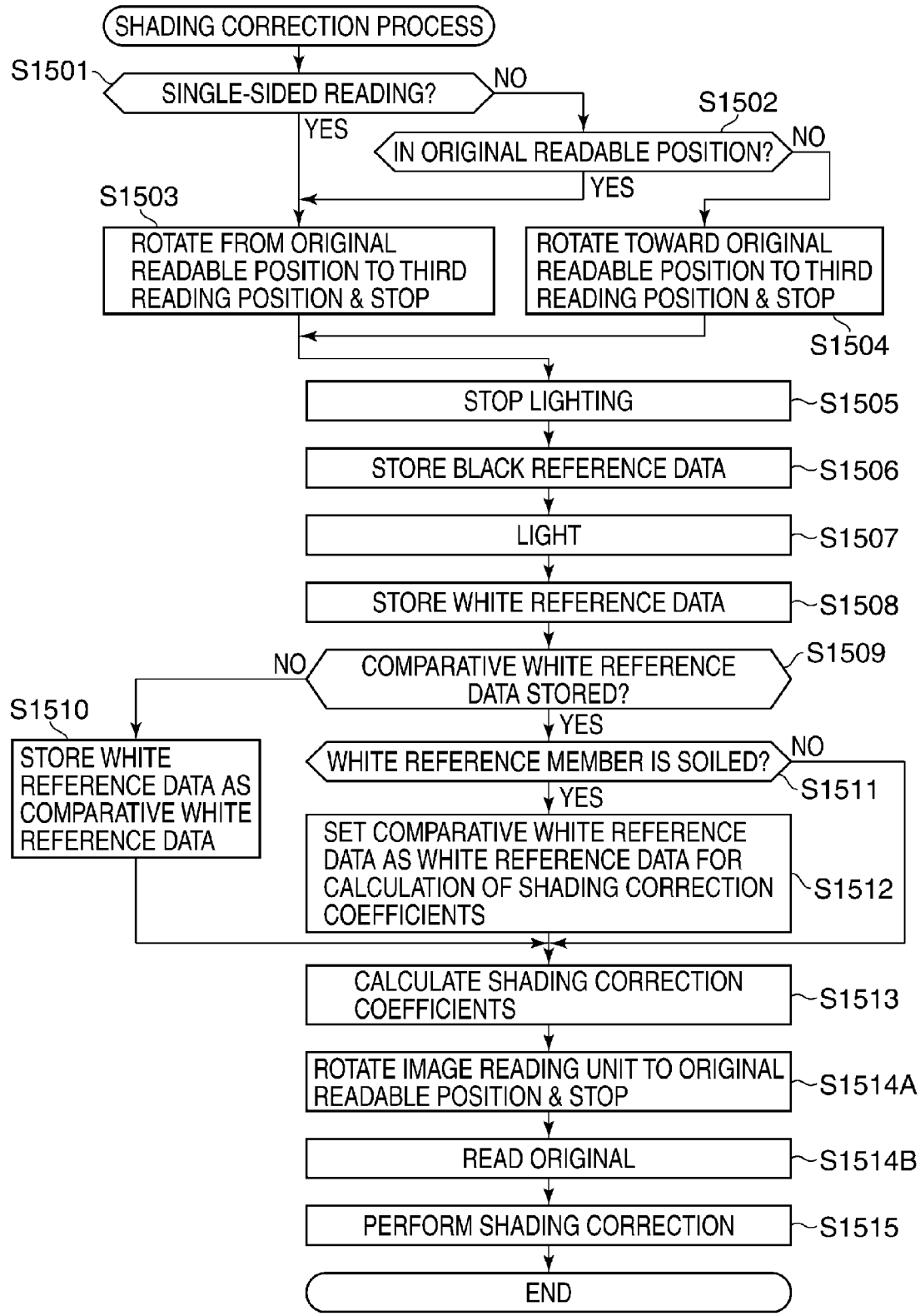

ROTATABLE IMAGE READING APPARATUS THAT PERFORMS SHADING CORRECTION, METHOD OF CONTROLLING THE SAME, AND STORAGE MEDIUM

BACKGROUND OF THE INVENTION

1. Field of the Invention

The present invention relates to an image reading apparatus.

2. Description of the Related Art

Conventionally, in an image forming apparatus, an original conveying system of an image reading unit that conveys an original and reads an image of an original being conveyed, and a recording material-conveying system of a printing unit for conveying recording materials are constructed independently of each other.

More specifically, the original conveying system and the recording material-conveying system are each provided with a sheet feeder for feeding originals or recording materials, a sheet feeder unit, guiding members forming predetermined conveying paths, and so on, independently of each other. Further, the original conveying system and the recording material-conveying system are each provided with a plurality of conveying roller pairs, a drive force transmission unit for transmitting a drive force to the plurality of conveying roller pairs, a motor as a drive source, a drive circuit of the motor, a sheet discharging section, and so on.

For this reason, it is inevitable that the entire mechanism construction of the image forming apparatus has become increasingly complex and the cost and size of the apparatus have been increased.

To solve this problem, there has been proposed an image forming apparatus in which an image reading unit is provided in a recording material-conveying path extending from a sheet feeder to a sheet discharger, thereby forming respective sections of the original conveying system and the recording material-conveying system as a section which can be shared between them, to thereby attain reduction of the size of the image forming apparatus (see e.g. Japanese Patent Laid-Open Publication No. 2000-185881).

However, the image forming apparatus disclosed in Japanese Patent Laid-Open Publication No. 2000-185881 has the image reading unit arranged in an intermediate portion of the recording material-conveying path e.g. between a fixing device and the sheet discharger, and hence the path for conveying an original to be read becomes long. This configuration makes it difficult to reduce time for reading the original.

Further, the image reading unit is provided in the recording material-conveying path used for usual printing, and hence when an original stays in the recording material-conveying path, the print operation cannot be performed. Therefore, the print operation has to be stopped during the operation for reading the original.

Further, not only an original but also a recording material passes an original reading surface of the original reading unit, and hence the reading surface is liable to get soiled, and what is more, time to perform correction of the original reading unit is limited.

SUMMARY OF THE INVENTION

The present invention provides an image reading apparatus capable of efficiently performing shading correction, a method of controlling the same, and a storage medium.

In a first aspect of the present invention, there is provided an image reading apparatus comprising a reading unit configured to be rotatable for reading an original, a control unit configured to cause the reading unit to read, while the reading unit rotates after reading an image of the original, image data for use in correction of the read image, and a correction unit configured to perform the correction using the image data read by the reading unit.

In a second aspect of the present invention, there is provided a method of controlling an image reading apparatus including a reading unit configured to be rotatable for reading an original, comprising causing the reading unit to read, while the reading unit rotates after reading an image of the original, image data for use in correction of the read image, and performing the correction using the image data read by the reading unit.

In a third aspect of the present invention, there is provided a non-transitory computer-readable storage medium storing a computer-executable program for causing a computer to execute a method of controlling an image reading apparatus including a reading unit configured to be rotatable for reading an original, wherein the method comprises causing the reading unit to read, while the reading unit rotates after reading an image of the original, image data for use in correction of the read image, and performing the correction using the image data read by the reading unit.

According to the present invention, it is possible to provide an image reading apparatus capable of efficiently performing shading correction.

Further features of the present invention will become apparent from the following description of exemplary embodiments with reference to the attached drawings.

BRIEF DESCRIPTION OF THE DRAWINGS

FIGS. 10A to 10C are diagrams useful in explaining a rotational operation of the image reading unit appearing in FIG. 1.

FIG. 14 is a flowchart of a shading correction process executed by a CPU appearing in FIG. 8.

DESCRIPTION OF THE EMBODIMENTS

The present invention will now be described in detail below with reference to the accompanying drawings showing embodiments thereof. Note that in the following description, processing for forming an image on a recording material is sometimes expressed as printing.

Figure 1:
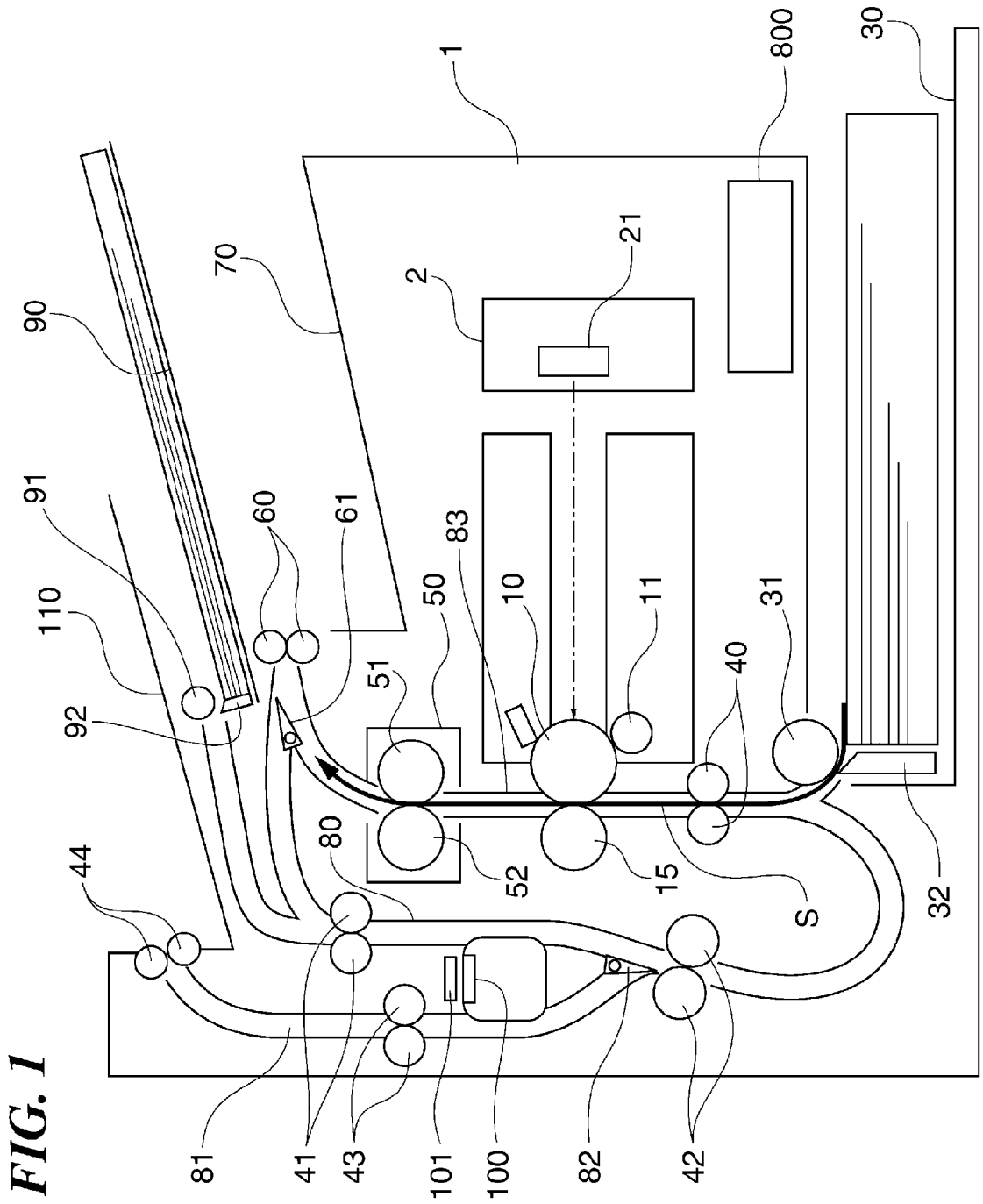
FIG. 1 is a schematic diagram of an image forming apparatus as an image reading apparatus according to an embodiment of the present invention.

FIG. 1 is a schematic diagram of an image forming apparatus 1 as an image reading apparatus according to an embodiment of the present invention.

In FIG. 1, the image forming apparatus 1 is provided with a shared conveying path 80, an original-dedicated conveying path 81, and an image-forming conveying path 83. The shared conveying path 80 is a conveying path configured to be shared for use in selectively conveying a recording sheet on which an image is to be formed and an original, which is e.g. a conveying path used for double-sided printing. Differently from the shared conveying path, the original-dedicated conveying path 81 is a conveying path dedicated to reading a reverse side of the original, and is used for conveying the original which is an object to be read. Further, the image forming conveying path 83 is a conveying path used for conveying a recording sheet when an image is printed on the recording sheet.

Along these conveying paths, a recording sheet is conveyed by a CST pickup roller 31, conveying roller pairs 40, 41, 42, 43, and 44, a heating roller 51, a pressure roller 52, a discharge roller pair 60, a double-sided-printing flapper 61, a switchback flapper 82, and so forth. A CIS pickup roller 91 and a separation section 92 convey originals accommodated in a second sheet feeder 90 to the conveying roller pair 41 one by one. Further, the originals are discharged by the conveying roller pair 44 onto a second discharge section 110.

An image reading unit 100 corresponds to a reading unit in the present invention, and includes an image sensor for reading an original, as described hereinafter. Further, the image reading unit 100 rotates about a rotational axis. This makes it possible to bring the image reading unit 100 to a first reading position (one of first and second orientations) in which an original being conveyed along the dedicated conveying path can be read by the image sensor, and a second reading position (the other of the first and second orientations) in which an original being conveyed along the shared conveying path can be read by the image sensor. Note that the position of the image reading unit 100 is switched from the first reading position to the second reading position by rotating through 180 degrees about the rotational axis.

Further, the reading unit 100 is capable of reading a white reference member 101 used for shading correction. The white reference member 101 is disposed at such a location that when the image reading unit 100 comes to a third reading position during rotation from one of the first reading position and the second reading position to the other, the image reading unit 100 can read the white reference member 101.

Therefore, the image reading unit 100 is rotatable such that it can selectively face the white reference member 101, the shared conveying path 80, and the original-dedicated conveying path 81.

Further, electrical equipment 800 controls the overall operation of the image forming apparatus 1. The arrangement of the electrical equipment 800 will be described hereinafter.

Hereafter, a description will be given of the image forming apparatus 1 by focusing on the movement of a recording sheet (recording material) with reference to FIGS. 1 to 7. First, with reference to FIG. 1, a process up to the completion of single-sided printing or a process up to the completion of printing on one side of a sheet in double-sided printing will be described.

In FIG. 1, in the center of the image forming apparatus 1, there are provided a rotatable photosensitive drum 10 as an image bearing member, and a developing roller 11 which is arranged in parallel with the photosensitive drum 10, and rotates while holding toner.

Upon receipt of a print signal indicative of a print instruction from a host computer or an operating section, neither of which is shown, a light emitting section 21 provided in an optical unit 2 irradiates a surface of the rotating photosensitive drum 10 with a laser beam. On the surface of the photosensitive drum 10 irradiated with the laser beam, an electrostatic latent image is formed.

The developing roller 11 supplies toner held therein onto the latent image on the surface of the photosensitive drum 10 while rotating, whereby a toner image is formed on the surface of the photosensitive drum 10.

On the other hand, the recording sheets S accommodated in a first sheet feeder 30 are conveyed by the CST pickup roller 31 and a separation section 32 to the conveying roller pair 40 one by one. The conveying roller pair 40 conveys each recording sheet S to a transfer roller 15 such that a leading end of a toner image on the surface of the photosensitive drum 10 and a leading end of the recording sheet S meet at the transfer section 15 in proper timing.

The toner image conveyed by rotation of the photosensitive drum 10 to the transfer roller 15 is transferred onto the recording sheet S by an applied bias voltage and pressure provided to the transfer roller 15. Further, the transfer roller 15 conveys the recording sheet S to a fixing section 50.

In the fixing section 50, the toner image is fixed onto the recording sheet S by heat from the rotatable heating roller 51 and pressure of the rotatable pressure roller 52 opposed to the heating roller 51. The recording sheet S having the toner image fixed thereon is conveyed to the discharge roller pair 60.

In the case of single-sided printing, the discharge roller pair 60 conveys the recording sheet S directly out onto a first discharge section 70, where the recording sheet S is accumulated, whereby the single-sided printing is completed. To improve accuracy of alignment of the printed recording sheets, the first discharge section 70 is provided with a gradually-rising slope from the vicinity of a discharge outlet in a recording sheet-discharging direction.

Figure 2:
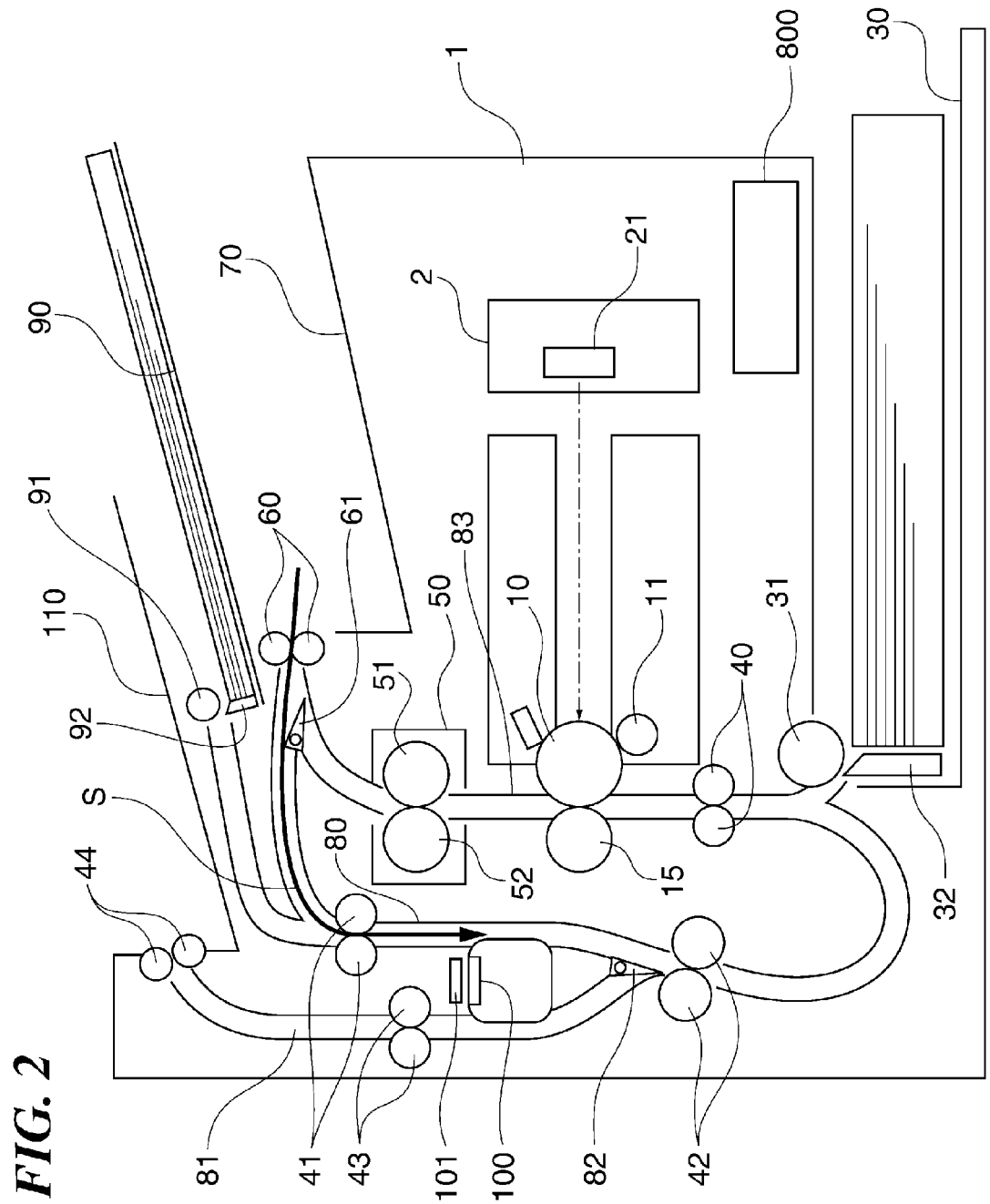
FIG. 2 is a diagram of the image forming apparatus, which is useful in explaining a process up to the completion of double-sided printing.

On the other hand, in the case of double-sided printing, the recording sheet S is not conveyed out by the discharge roller pair 60, but is caused to switch back as described hereafter with reference to FIG. 2.

FIG. 2 is a diagram of the image forming apparatus 1, which is useful in explaining a process up to the completion of double-sided printing.

Following part of the process for single-sided printing described with reference to FIG. 1, during conveyance of the recording sheet S by the discharge roller pair 60, when a trailing end of the recording sheet S passes the double-sided-printing flapper 61, the double-sided-printing flapper 61 switches the conveying path. Then, the discharge roller pair 60 is reversely rotated to convey the recording sheet S to the shared conveying path 80 to thereby cause the recording sheet S to switch back.

The recording sheet S caused to switch back is conveyed to the image reading unit 100 via the conveying roller pair 41. Then, the recording sheet S is conveyed again via the conveying roller pairs 42 and 40 to the transfer roller 15, where a toner image is transferred and fixed thereon, and then the recording sheet S is accumulated on the first discharge section 70, thereby completing the double-sided printing.

Next, with reference to FIGS. 3 to 7, a process in which the image forming apparatus 1 reads both sides of an original and prints on both sides of a sheet will be described in detail.

Figure 3:
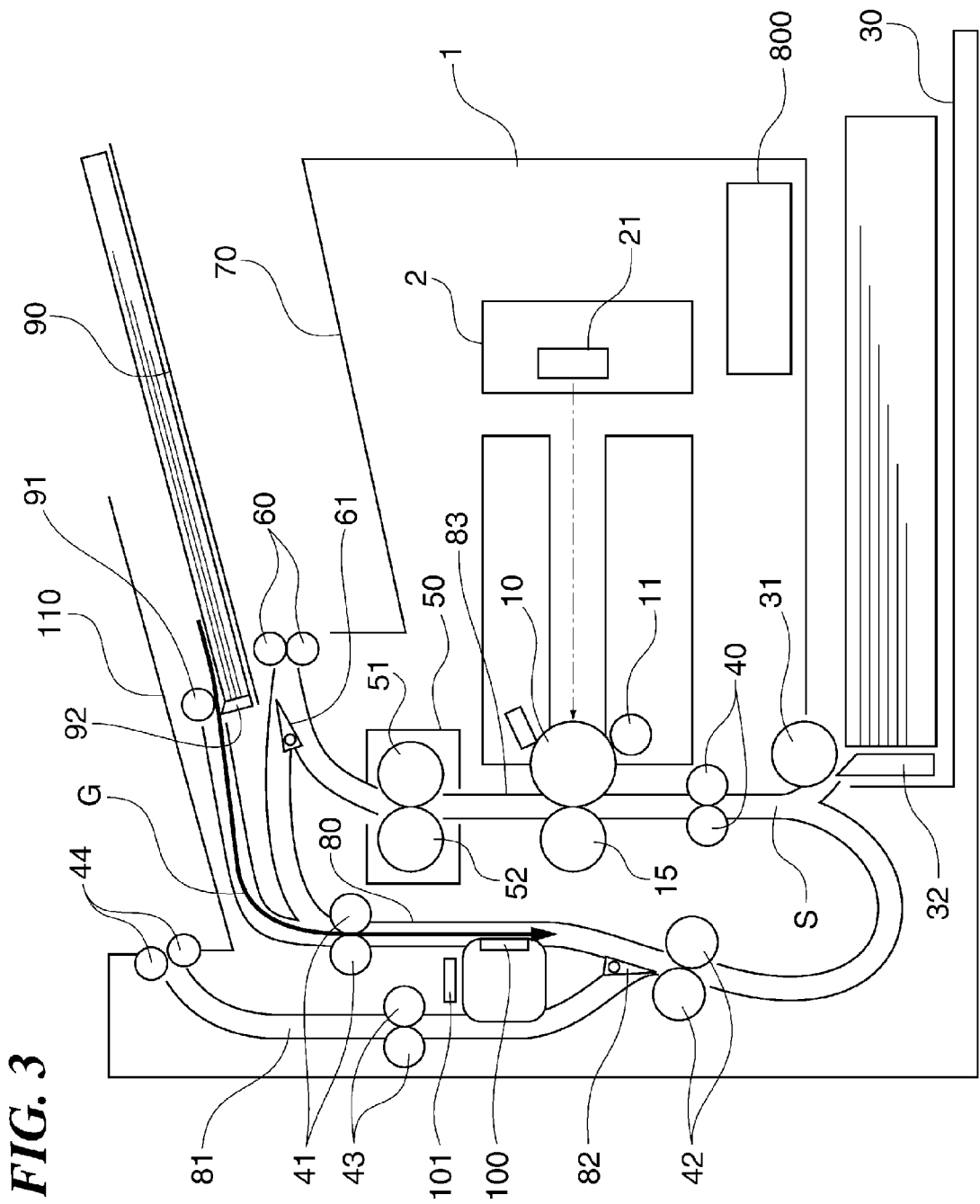
FIG. 3 is a diagram of the image forming apparatus, which is useful in explaining a process up to the completion of reading of a front side of an original.

FIG. 3 is a diagram of the image forming apparatus 1, which is useful in explaining a process up to the completion of reading a front side of the original.

In FIG. 3, originals G set in the second sheet feeder 90 is conveyed to the conveying roller pair 41 by the CIS pickup roller 91 and the separation section 92 one by one.

On the other hand, the image reading unit 100 performs the following control before the start of reading of a first side which is the front side of the original G fed from the second sheet feeder 90: The image reading unit 100 performs correction of a shading correction coefficient used for correcting variation in output level of an image signal therefrom due to non-uniformity in sensitivity thereof, non-uniformity in light source or light amount, and so on.

The shading correction coefficient is calculated from a white reference image read by the image reading unit 100 in a state where light is irradiated to the white reference member 101 when the image reading unit 100 is in a position facing the white reference member 101 and a black reference image read by the image reading unit 100 in a state where light is not irradiated to the white reference member 101 when the image reading unit 100 is in the same position.

The image reading unit 100 performs correction of the shading correction coefficient, and is then rotated to a position facing the shared conveying path 80. The conveying roller pair 41 conveys the original G to the image reading unit 100.

At this time, the image reading unit 100 has already been waiting at the second reading position which is a position facing the shared conveying path 80, and one side of the original G is read by the image reading unit 100. The image data read by the image reading unit 100 is stored in an image memory 804 (see FIG. 8), referred to hereinafter, as the image data of the first side of the original.

Note that the white reference member 101 is disposed facing downward so as to prevent dust from attaching thereto. Further, although in this example, the white reference member is used as the reference member, color of the reference member is not limited to white.

Figure 4:
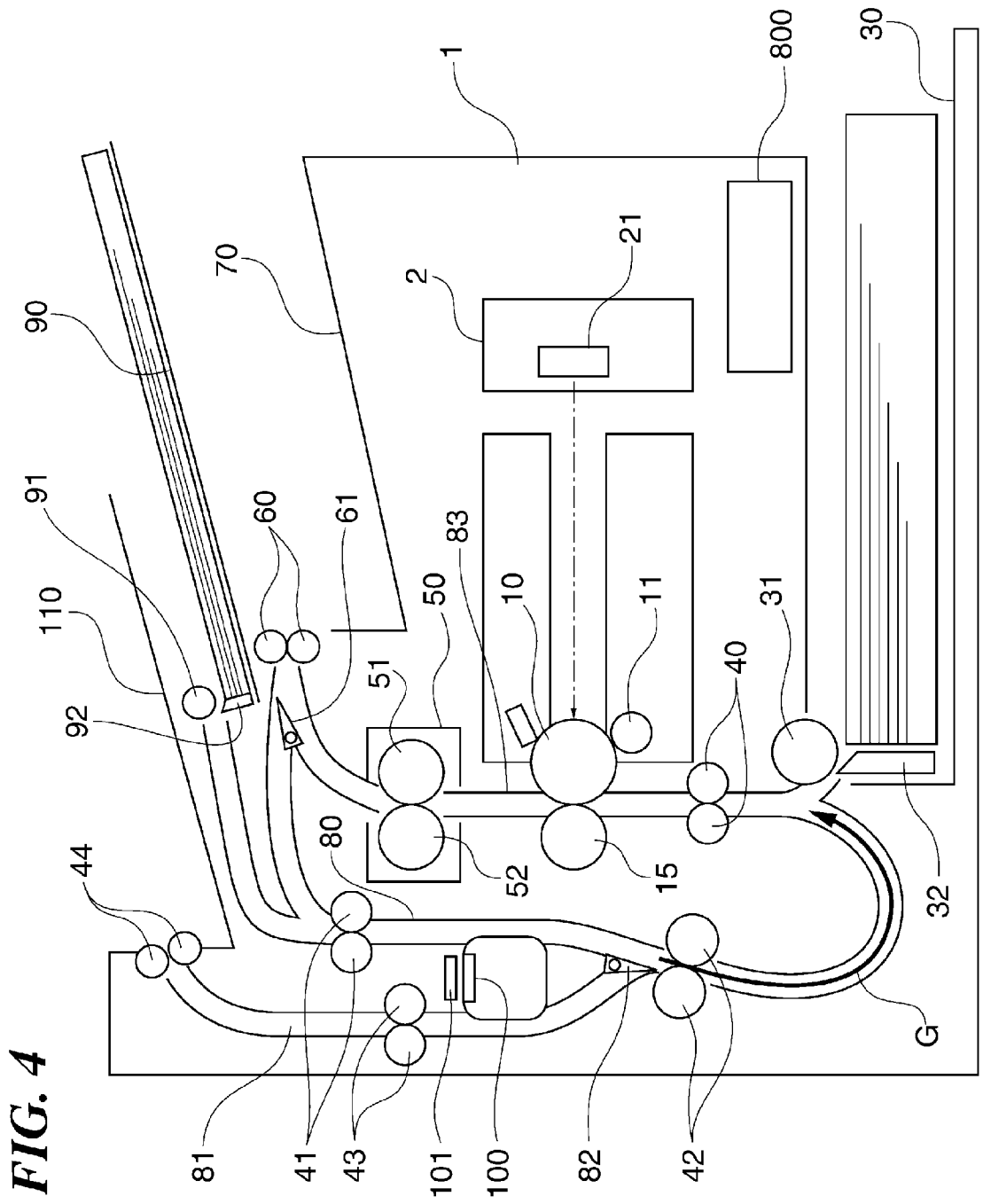
FIG. 4 is a diagram of the image forming apparatus, which is useful in explaining operations performed on the original after reading the front side thereof.

FIG. 4 is a diagram of the image forming apparatus 1, which is useful in explaining operations performed on the original G after reading the front side thereof.

In FIG. 4, the original G having passed the image reading unit 100 is conveyed to the conveying roller pair 42. The conveying roller pair 42 is stopped at a time point when the trailing end of the original G passes the switchback flapper 82. Therefore, the original G is at rest in a state sandwiched by the conveying roller pair 42. After the elapse of a predetermined time period, the original G is conveyed from this state to the original-dedicated conveying path 81.

Further, after reading of the first side of the original is completed, the image reading unit 100 reads the white reference image and the black reference image which are used as references for calculation of the shading correction coefficient, and performs correction of the shading correction coefficient.

More specifically, the image reading unit 100 reads a white reference image and a black reference image from the white reference member 101 when the image reading unit 100 is in the position facing the white reference member 101, where the image reading unit 100 is halfway through rotation to the position facing the original-dedicated conveying path 81, which is being performed so as to read a second side of the original. The image reading unit 100 reads the white reference image and the black reference image from the white reference member 101 before the start of reading of the second side which is a reverse side of the original.

Figure 5:
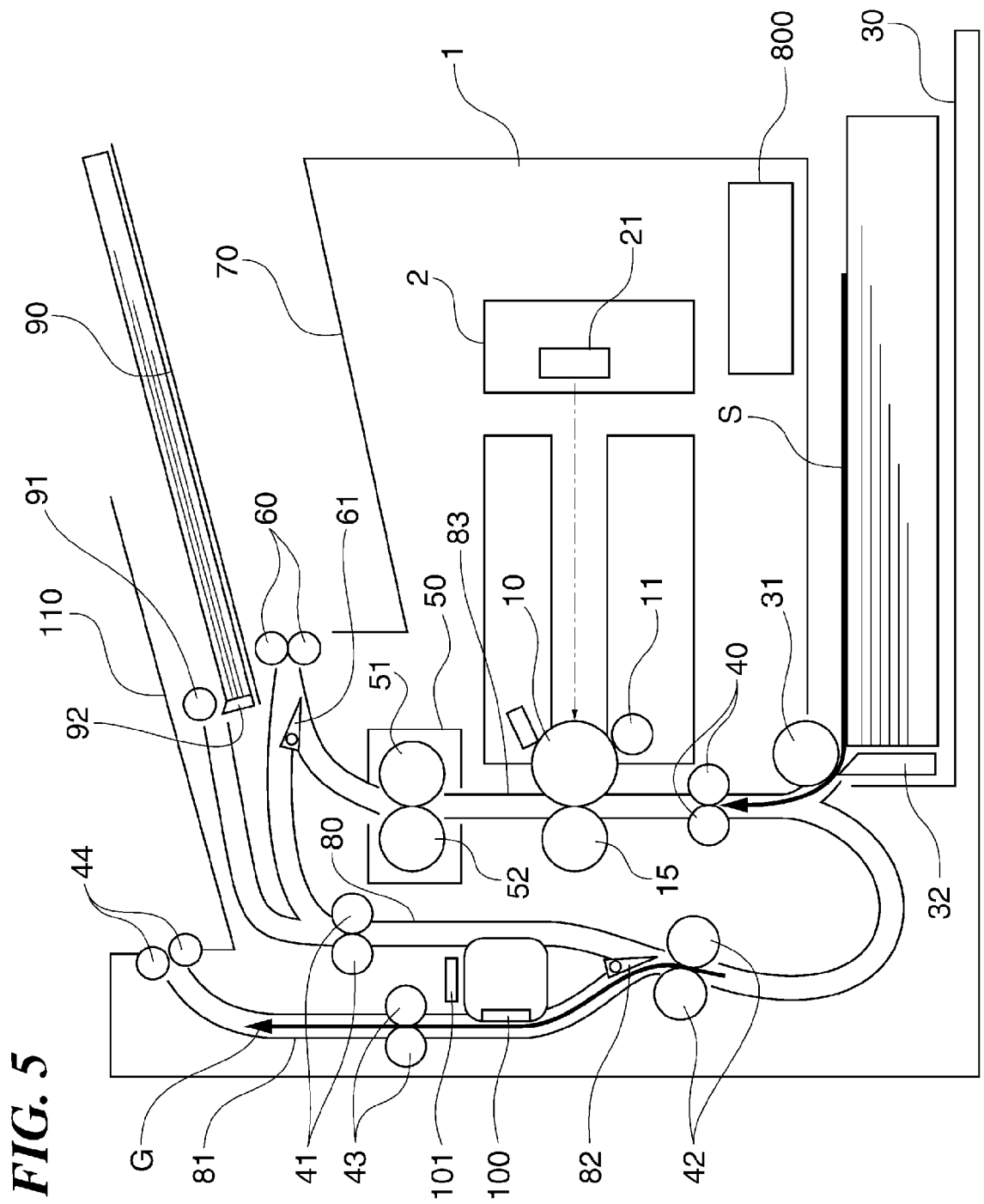
FIG. 5 is a diagram of the image forming apparatus, which is useful in explaining a process for reading a reverse side of the original.

FIG. 5 is a diagram of the image forming apparatus 1, which is useful in explaining a process for reading the reverse side of the original.

In FIG. 5, almost as soon as the switchback flapper 82 switches the destination of conveying the original G from the shared conveying path 80 to the original-dedicated conveying path 81, the image reading unit 100 is rotated to the first reading position which is the position facing the original-dedicated conveying path 81.

When the conveying roller pair 42 is reversely rotated, the original G is conveyed to the image reading unit 100 along the original-dedicated conveying path 81.

The original G is conveyed to the image reading unit 100, and as it passes the image reading unit 100, the second side thereof is read and stored in the image memory 804 as the image data of the second side.

On the other hand, the recording sheets S are fed from the first sheet feeder 30 and conveyed to the conveying roller pair 40 one by one. Almost at the same time, a latent image is formed on the photosensitive drum 10 by the light emitting section 21 based on the image data of the second side of the original G, which is stored in the image memory 804.

Next, a toner image formed based on the latent image is transferred onto the recording sheet S by the transfer roller 15, and then the recording sheet S is conveyed to the fixing section 50 and so forth, whereby printing on the second side is completed. As described above, printing on the reverse side is performed first.

Although in FIG. 5, feeding of the recording sheet S is started at the start of reading of image data on the second side, the recording sheet S may be conveyed after the image data on the second side has been read.

Figure 6:
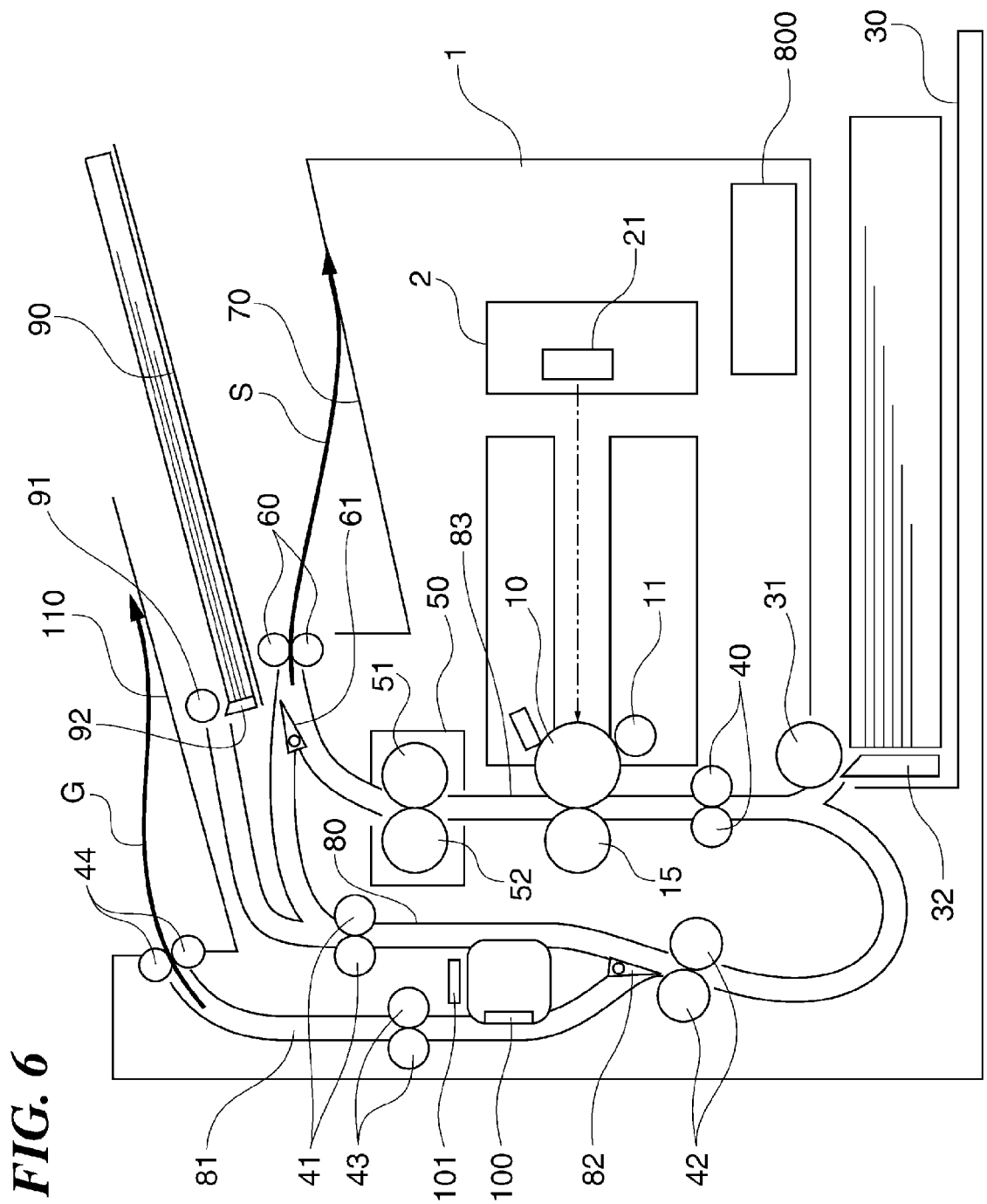
FIG. 6 is a diagram of the image forming apparatus, which is useful in explaining a state thereof at a time when reading of the reverse side of the original is completed.

FIG. 6 is a diagram of the image forming apparatus 1, which is useful in explaining a state thereof at a time when reading of the reverse side of the original is completed.

The original G which has been read is conveyed to the conveying roller pairs 43 and 44, and is discharged to the outside of the apparatus. As a consequence, the original G is accumulated on the second discharge section 110. When the trailing end of the original G passes the switchback flapper 82, the switchback flapper 82 performs switching such that the original-dedicated conveying path 81 is closed and the shared conveying path 80 is opened so as to cause the recording sheet S to be conveyed toward the conveying roller pair 40.

The recording sheet S on which printing on the second side has been completed is conveyed toward the shared conveying path 80 by inverse rotation of the discharge roller pair 60.

Figure 7:
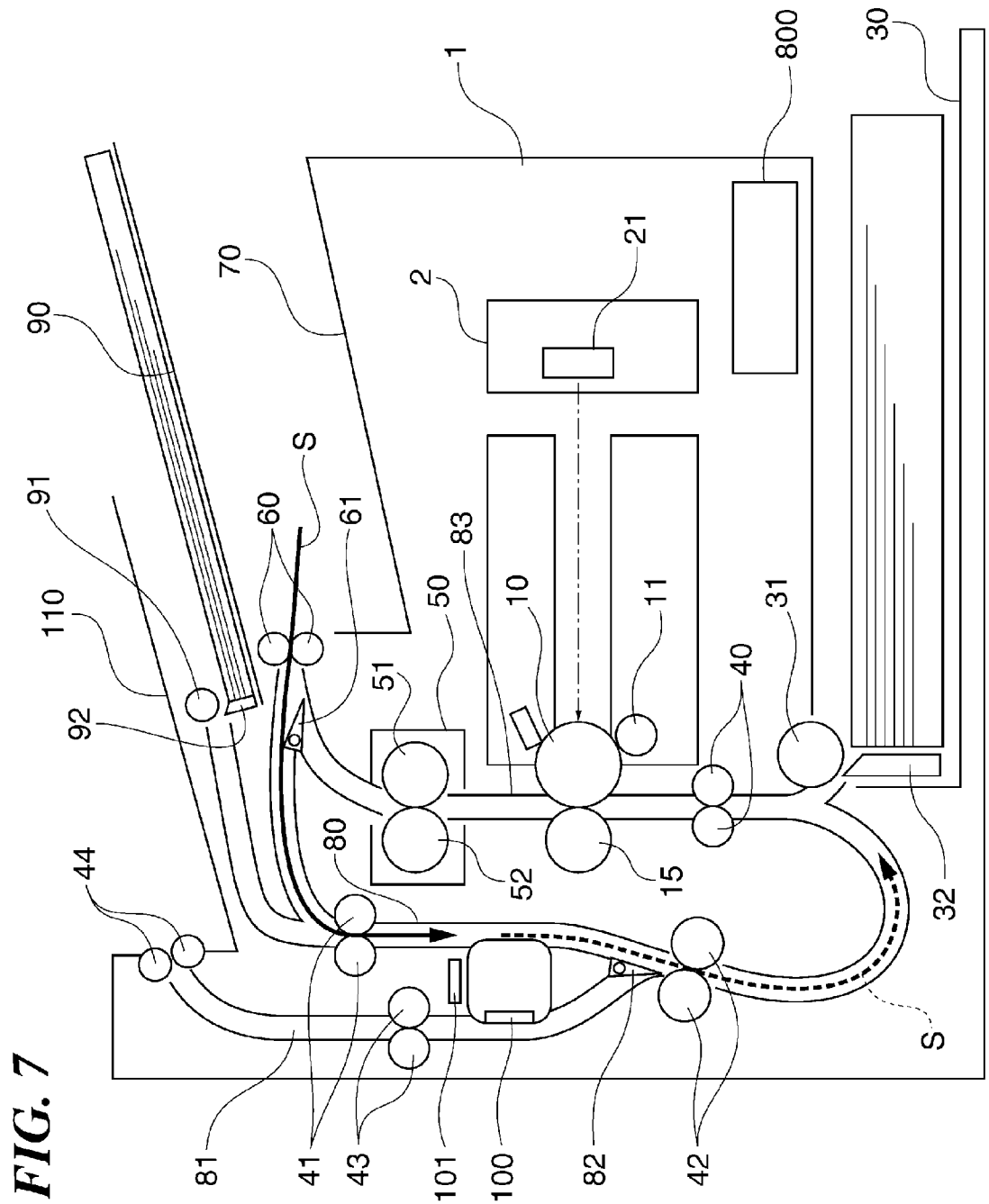
FIG. 7 is a diagram of the image forming apparatus, which is useful in explaining a process for printing the front side of the recording sheet.

FIG. 7 is a diagram of the image forming apparatus 1, which is useful in explaining a process for printing the front side of the recording sheet.

In FIG. 7, the recording sheet S conveyed to the shared conveying path 80 passes the image reading unit 100 which has been rotated to its inverted position, and is conveyed, as indicated by a broken line, to the conveying roller pair 40 via the conveying roller pair 42. Further, the recording sheet S is conveyed to the transfer roller 15 again. The second side of the recording sheet S has already been subjected to printing, and a latent image is formed on the photosensitive drum 10 by the light emitting section 21 based on the image data of the first side which is stored in the image memory 804.

Next, a toner image formed based on the latent image is transferred onto the recording sheet S by the transfer roller 15, and then the recording sheet S is conveyed to the fixing section 50 and so on, whereby printing on the first side is completed. The recording sheet S having the images thus printed on both sides is discharged out of the apparatus onto the first discharge section 70 where it is accumulated.

Figure 8:
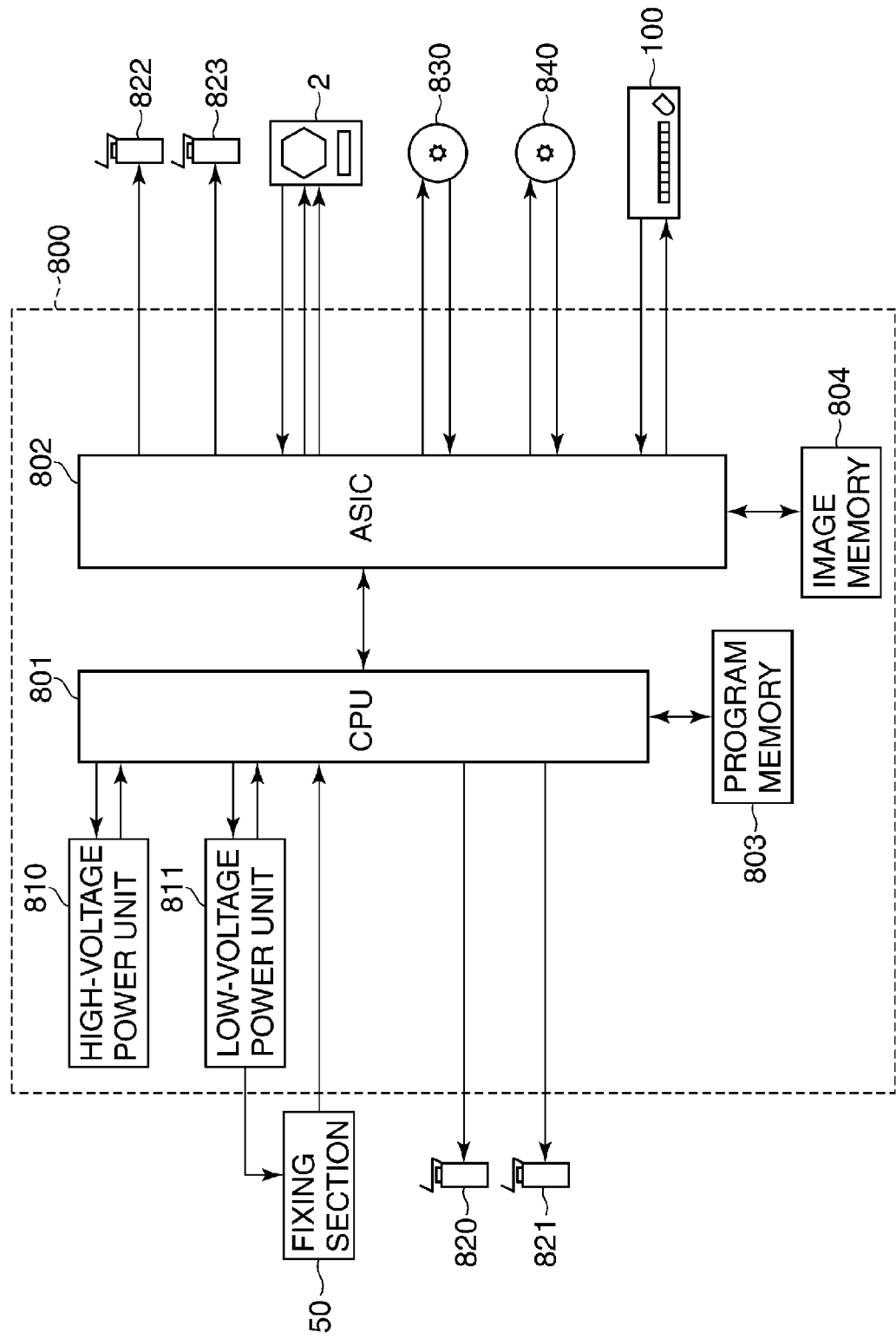
FIG. 8 is a diagram of the general arrangement of electrical equipment and peripheral devices appearing in FIG. 1.

FIG. 8 is a diagram of the general arrangement of the electrical equipment 800 and peripheral devices appearing in FIG. 1.

In FIG. 8, the electrical equipment 800 comprises a CPU (central processing unit) 801, a high-voltage power unit 810, a low-voltage power unit 811, a program memory 803, an ASIC (application specific integrated circuit) 802, and the image memory 804.

The program memory 803 stores various programs and data, and the image memory 804 stores image data indicative of an image as mentioned above.

The CPU 801 operates according to the various programs and data stored in the program memory 803 to thereby control the overall operation of the image forming apparatus 1. Further, as shown in FIG. 8, the CPU 801 is connected to the high-voltage power unit 810, the low-voltage power unit 811, the fixing section 50, a double-sided-printing flapper solenoid 820, a switchback solenoid 821, the program memory 803, and the ASIC 802.

The high-voltage power unit 810 controls a primary charge bias, a developing bias, a primary transfer bias, and a second transfer bias, which are required for an electrophotographic process, according to instructions from the CPU 801.

The low-voltage power unit 811 supplies power to the fixing section 50 according to instructions from the CPU 801. The CPU 801 monitors temperature using a thermistor (not shown) provided in the fixing section 50, and controls the low-voltage power unit 811 so as to maintain the fixing temperature at a fixed temperature.

The double-sided-printing flapper solenoid 820 drives the double-sided-printing flapper 61 according to instructions from the CPU 801. Further, the switchback solenoid 821 drives the switchback flapper 82 according to instructions from the CPU 801.

A CST sheet-feeding solenoid 822 drives the CST pickup roller 31 when the recording sheet S is fed, according to instructions from the CPU 801. A CIS feeding solenoid 823 drives the CIS pickup roller 91 when an original is fed, according to instructions from the CPU 801.

Further, the above-mentioned optical unit 2 is connected to the CPU 801 via the ASIC 802. The CPU 801 controls a polygon mirror, motors, and a laser emission element which are included in the optical unit 2 via the ASIC 802 to thereby scan the surface of the photosensitive drum 10 with a laser beam to thereby draw a desired electrostatic latent image. To this end, the CPU 801 outputs control signals to the ASIC 802 to thereby control the optical unit 2.

A main motor 830 drives the conveying roller pair 40, the photosensitive drum 10, the transfer roller 15, the heating roller 51, and the pressure roller 52, for printing on a recording sheet S, according to instructions received from the CPU 801 via the ASIC 802.

A double-sided-printing drive motor 840 drives the CIS pickup roller 91, the conveying roller pairs 41, 42, 43, and 44 according to instructions received from the CPU 801 via the ASIC 802.

The ASIC 802 performs speed control for the motors of the optical unit 2, the main motor 830, and the double-sided-printing drive motor 840 based on instructions from the CPU 801. The ASIC 802 detects a tach signal which is a pulse signal output whenever each motor is rotated, and controls the speed of each motor by outputting an acceleration or deceleration signal to the motor such that an interval of the tach signal becomes a predetermined interval.

Further, the image reading unit 100 is connected to the ASIC 802. Although various signals are exchanged between the image reading unit 100 and the ASIC 802, this will be described hereinafter.

As described above, the construction of the electrical equipment 800 using the ASIC 802 has more merit in that it is possible to reduce the control load on the CPU 801.

The operation performed in printing and reading an original will be described again using the construction shown in FIG. 8. First, the operation performed in printing will be described. Upon receipt of a print instruction, the CPU 801 drives the main motor 830, the double-sided-printing drive motor 840, and the CST sheet-feeding solenoid 822, to thereby convey the recording sheet S.

After the toner image formed on the surface of the photosensitive drum 10 is transferred onto the recording sheet S by the transfer roller 15, the toner image is fixed by the fixing section 50, and then the recording sheet S is discharged onto the first discharge section 70 by the discharge roller pair 60.

When fixing the toner image, the CPU 801 generates a desired amount of heat by supplying predetermined electric power to the fixing section 50 via the low-voltage power unit 811, and applies the generated heat to the recording sheet S to thereby fuse and fix the toner image on the recording material.

Next, the operation performed in reading the original will be described. First, the CPU 801 receives from the host computer or the operating section, neither of which is shown, a scan command which instructs reading of an original. Then, the CPU 801 drives the double-sided-printing flapper solenoid 820 and the double-sided-printing motor 840 and operates the CIS sheet-feeding solenoid 823, to thereby cause torque of the double-sided-printing motor 840 to be transmitted to the CIS pickup roller 91 to convey the original G.

The CPU 801 stores the image read from the image reading unit 100 via the ASIC 802 in the image memory 804 connected to the ASIC 802. Then, the CPU 801 drives the switchback solenoid 821 to operate the switchback flapper 82 such that the original is guided into the original-dedicated conveying path 81, and drives the double-sided-printing drive motor 840 such that the original G is conveyed to the second discharge section 110.

Figure 9:
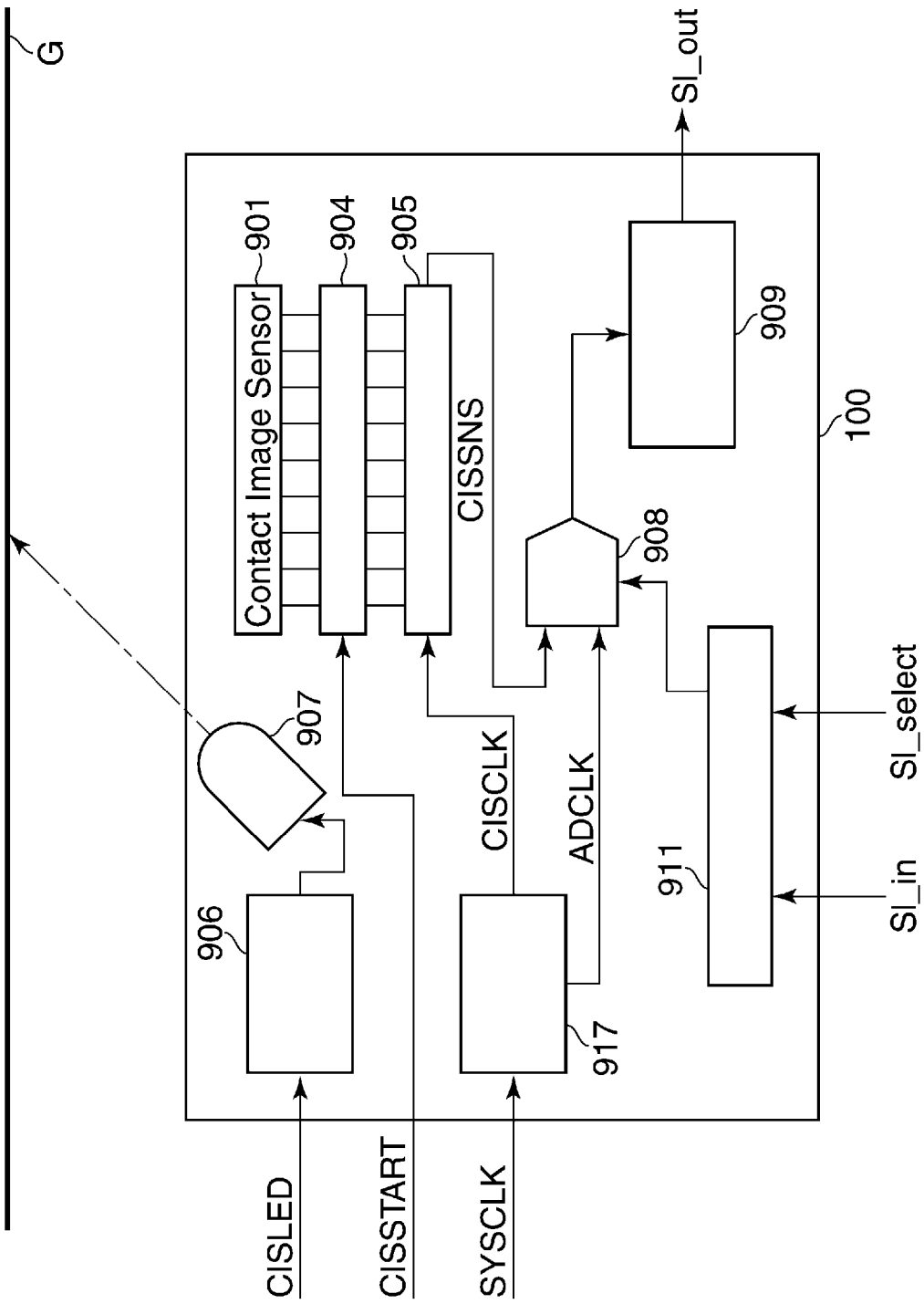
FIG. 9 is a schematic diagram of an image reading unit appearing in FIG. 1.

FIG. 9 is a schematic diagram of the image reading unit 100 appearing in FIG. 1.

In FIG. 9, the image reading unit 100 includes a contact image sensor (CIS) 901, an output buffer 904, and a shift register 905. The image reading unit 100 further includes an electric current amplifier 906, a light emitting device 907, an A/D converter 908, an output interface circuit 909, a control circuit 911, and a timing generator 917.

The contact image sensor 901 is formed by arranging photodiodes corresponding in number to a plurality of pixels in an array, and for example, the photodiodes corresponding in number to 10368 pixels are arranged in an array at a specified main scan density (e.g. 1200 dpi). The light emitting device 907 uniformly irradiates an original G.

Next, the signals exchanged with the ASIC 802 will be described. A CISSTART signal is a start pulse signal to start the contact image sensor 901. A CISCLK signal is a clock signal transferred to the contact image sensor 901.

A SYSCLK signal is a system clock signal to determine the operating speed of the contact image sensor 901. An ADCLK signal is a CIS sampling clock signal to determine a sampling speed of the A/D converter 908. A CISLED signal is a light emitting device control signal for controlling the light emitting device 907.

An SI_in signal and an SI select signal are signals for variably controlling an A/D conversion gain of the A/D converter 908. For example, when the contrast of a picked up image cannot be obtained, the CPU 801 can increase the contrast by increasing the A/D conversion gain of the A/D converter 908. This makes it possible to always obtain the optimum contrast.

A CISSNS signal is a signal output by the shift register 905, indicative of data set in the output buffer 904. An SI_out signal is a signal generated by converting the CISSNS signal to a digital signal by the A/D converter 908.

Next, the operation of the image reading unit 100 will be described. When the CISSTART signal is activated, the contact image sensor 901 starts accumulating electrostatic charges according to received light, and sequentially sets data in the output buffer 904.

Next, when the CISCLK signal is provided, the data set in the output buffer 904 is transferred to the A/D converter 908 by the shift register 905 as the CISSNS signal. The frequency of the CISCLK signal is e.g. approximately 500 kHz to 1 MHz.

The CISSNS signal has a predetermined data assured area, and hence it is necessary to perform sampling after the elapse of a predetermined time period from the timing of rising of the CISCLK signal. Further, the CISSNS signal is output in synchronism with both of a rising edge and a falling edge of the CISCLK signal. For this reason, the frequency of the ADCLK signal is set to twice the frequency of the CISCLK signal, and the CISSNS signal is sampled at the rising edge of the ADCLK signal.

The timing generator 917 divides the frequency of the SYSCLK signal to generate the ADCLK signal and the CISCLK signal, and the ADCLK signal has a phase lag corresponding to the above-mentioned data assured area with respect to the CISCLK signal.

The CISSNS signal converted from analog to digital by the A/D converter 908 is controlled by the output interface circuit 909 at a predetermined timing, and is output as the SI_out signal of serial data. At this time, an analog output reference voltage is output as the CISSNS signal to make pulses thereof, corresponding in number to the predetermined number of pixels starting from the CISSTART signal, unusable as effective pixels.

Although in the above description, all pixels are output as the CISSNS signal, to perform high-speed reading, the pixels may be divided into areas, and signals read from a plurality of areas may be simultaneously subjected to A/D conversion. Further, although in the above description, the contact image sensor 901 is used for the image reading unit 100, a CMOS sensor or a CCD sensor may be used in place of the contact image sensor 901.

FIGS. 10A to 10C are diagrams useful in explaining the rotational operation of the image reading unit 100 appearing in FIG. 1.

As shown in FIGS. 10A to 10C, the image reading unit 100 comprises the above-mentioned contact image sensor 901, the light emitting device 907, and a lens 1002. Further, the image reading unit 100 rotates about a rotational shaft 1001.

With this arrangement, light emitted from the light emitting device 907 and reflected by the original G or the white reference member 101 is received by the contact image sensor 901 via the lens 1002.

Further, the image reading unit 100 rotates to the position facing the shared conveying path 80, the position facing the original-dedicated conveying path 81, or the position facing the white reference member 101, by rotating about the rotational shaft 1001.

FIG. 10A shows the image reading unit 100 reading the original G in the original-dedicated conveying path 81, at the first reading position, denoted by reference numeral 1010. FIG. 10B shows the image reading unit 100 reading the original G in the shared conveying path 80, at the second reading position, denoted by reference numeral 1011. FIG. 10C shows the image reading unit 100 reading the white reference member 101, at the third reading position, denoted by reference numeral 1012.

When the image reading unit 100 rotates from the first reading position 1010 shown in FIG. 10A to the second reading position 1011 shown in FIG. 10B, the image reading unit 100 passes the third reading position 1012 shown in FIG. 10C. Also when the image reading unit 100 rotates reversely from the second reading position 1011 shown in FIG. 10B to the first reading position 1010 shown in FIG. 10A, the image reading unit 100 similarly passes the third reading position 1012 shown in FIG. 10C. Of course, the image reading unit 100 can rotate from the first reading position 1010 shown in FIG. 10A to the third reading position 1012 shown in FIG. 10C and then rotate back to the first reading position 1010 shown in FIG. 10A again, and can also rotate from the second reading position 1011 shown in FIG. 10B to the third reading position 1012 shown in FIG. 10C and then rotate back to the second reading position 1011 shown in FIG. 10B again.

The above-mentioned movement of the image reading unit 100 will be described in further detail by referring to a process for reading one side of an original to perform single-sided printing.

Figure 11:
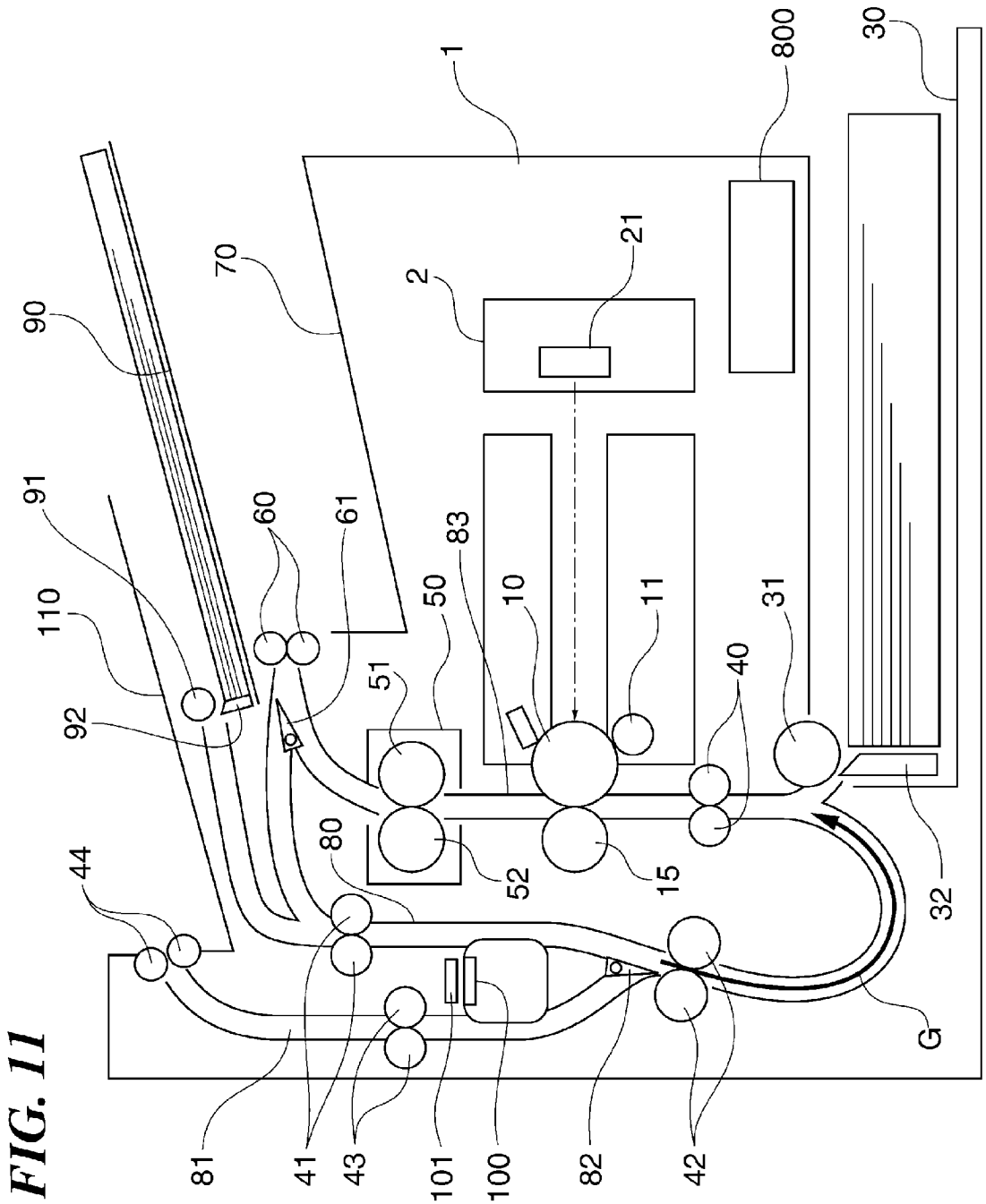
FIG. 11 is a diagram of the image forming apparatus, which is useful in explaining a state thereof in which reading of one side of an original has been completed.

FIG. 11 is a diagram of the image forming apparatus 1, which is useful in explaining a state thereof in which reading of one side (first side) of the original G has been completed.

The description of the operation at the start of reading the first side of the original G has been given hereinabove with reference to FIG. 3.

In FIG. 11, the original G having passed the image reading unit 100 is conveyed to the conveying roller pair 42. The conveying roller pair 42 is stopped when the trailing end of the original G passes the switchback flapper 82. Therefore, the original G is at rest in a state sandwiched by the conveying roller pair 42. After the elapse of a predetermined time period from this state, the original G is conveyed to the original-dedicated conveying path 81.

Further, after completion of reading of the first side of the original G, the image reading unit 100 is rotated to the third reading position facing the white reference member 101 to prepare for reading a second original set in the second sheet feeder 90.

Then, the image reading unit 100 reads the white reference image serving as a reference for calculating the shading correction coefficient from the white reference member 101 before the start of reading of the first side of the second original set in the second sheet feeder 90, and performs correction of the shading correction coefficient.

Figure 12:
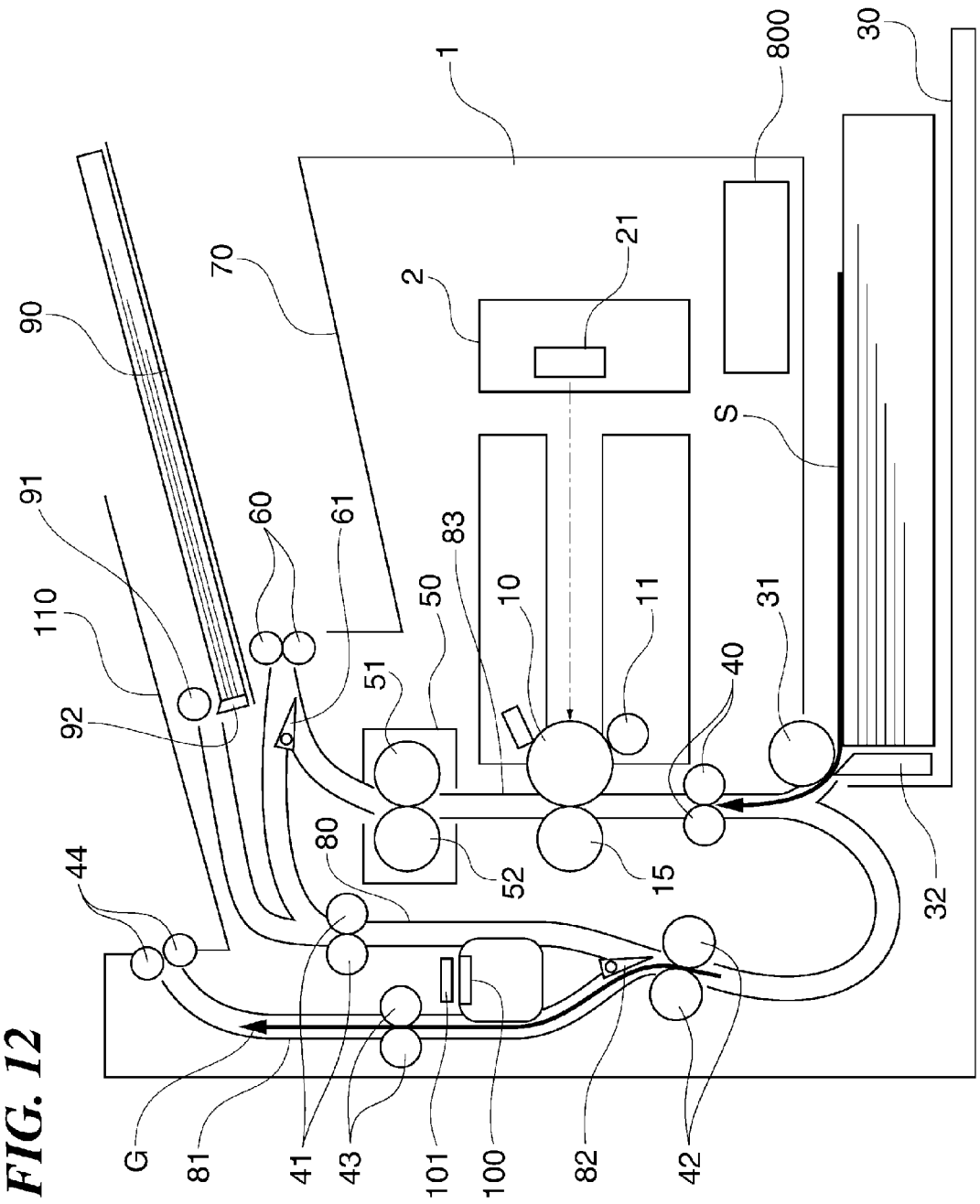
FIG. 12 is a diagram of the image forming apparatus, which is useful in explaining a state thereof at a time when the original is discharged.

FIG. 12 is a diagram of the image forming apparatus 1, which is useful in explaining a state thereof at a time when the original G is discharged.

In FIG. 12, the switchback flapper 82 switches the conveying path from the shared conveying path 80 to the original-dedicated conveying path 81, and the image reading unit 100 remains in the third reading position facing the white reference member 101 without being rotated to the first reading position facing the original-dedicated conveying path 81. When the conveying roller pair 42 is reversely rotated, the original G is conveyed along the original-dedicated conveying path 81. The subsequent movement of the original G has been described with reference to FIG. 6.

The recording sheets S fed from the first sheet feeder 30 are conveyed to the conveying roller pair 40 one by one. Almost simultaneously, a latent image is formed on the photosensitive drum 10 by the light emitting section 21 based on the image data of the first side of the original G stored in the image memory 804.

Next, after a toner image formed based on the latent image has been transferred onto the recording sheet S by the transfer roller 15, the recording sheet S is conveyed to the fixing section 50 and so forth. Then, the recording sheet S whose first side has been printed is accumulated on the first discharge section 70.

Figures 13A, 13B:
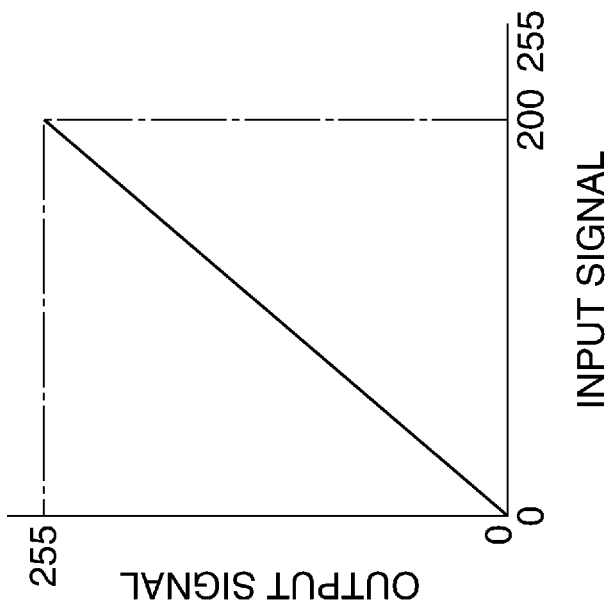
FIGS. 13A and 13B are diagrams useful for explaining an example of shading correction coefficients according to the present embodiment.

FIGS. 13A and 13B are diagrams useful in explaining an example of the shading correction coefficient according to the present embodiment.

FIGS. 13A and 13B show an example of shading correction in a case where image data output from the image reading unit 100 is a 8-bit (0 to 255 levels) digital signal.

Calculation of the shading correction coefficient is performed using a digital signal value output from the image reading unit 100 when the white reference member 101 is read by lighting the light emitting device 907 (hereinafter referred to as the "white signal level"), and a digital signal value output from the image reading unit 100 when the white reference member 101 is read by extinguishing the light emitting device 907 (hereinafter referred to as the "black signal level").

FIG. 13A shows an example of the signal level in the present embodiment, and FIG. 13B shows the shading correction coefficient.

As shown in FIG. 13A, the white signal level used as a reference corresponds to a signal value of 210, and the black signal level corresponds to a signal value of 10, and hence 10 is subtracted from each signal value. Then, by multiplying each value obtained by the above-mentioned subtraction by a correction coefficient 255/200 which is a slope of a straight line shown in FIG. 13B, it is possible to normalize each signal value within a signal value range of 0 to 255.

As a result, the white signal level is made correspondent to a signal value of 255, and the black signal level to a signal value of 0. By executing shading correction for each pixel as described above, the signal value obtained when the white reference member 101 is read by lighting the light emitting device 907 is normalized to 255, and the signal value obtained when the white reference member 101 is read by extinguishing the light emitting device 907 is normalized to 0. The white signal level and the black signal level thus normalized each exist in number corresponding to the number of pixels (or areas) which can be read by the contact image sensor 901. Therefore, in the following description, a set of the white signal levels corresponding in number to the number of pixels is expressed as white signal data, and a set of the black signal levels corresponding in number to the number of pixels is expressed as black signal data.

FIG. 14 is a flowchart of a shading correction process executed by the CPU 801 appearing in FIG. 8.

In FIG. 14, as mentioned hereinabove, the position of the image reading unit 100 where it faces the original-dedicated conveying path 81 is the first reading position 1010, the position of the image reading unit 100 where it faces the shared conveying path 80 is the second reading position 1011, and the position of the image reading unit 100 where it faces the white reference member 101 is the third reading position 1012.

First, upon receipt of a scan command signal indicative of an instruction for reading an original from the host computer or the operating section, neither of which is shown, the CPU 801 determines whether or not an original reading condition is single-sided reading (step S1501).

If it is determined in the step S1501 that the original reading condition is single-sided reading (YES to the step S1501), the CPU 801 proceeds to a step S1503.

On the other hand, if it is determined that the original reading condition is not single-sided reading (NO to the step S1501), the CPU 801 determines whether or not the image reading unit 100 is in a position where it can read the original (step S1502).

If it is determined in the step S1502 that the image reading unit 100 is not in a position where it can read the original (NO to the step S1502), the CPU 801 proceeds to a step 1504, wherein the image reading unit 100 is rotated toward the position where it can read the original and is once stopped at the third reading position 1012 (step S1504). Then, the CPU 801 proceeds to a step S1505. The image reading unit 100 temporarily remains in the third reading position 1012 from this step S1504 or a step S1503, referred to hereinafter, to a step S1513, and is then rotated to the position where it can read the original, in a step S1514A.

On the other hand, if it is determined in the step S1502 that the image reading unit 100 is in a position where it can read the original (YES to the step S1502), the image reading unit 100 is once rotated from the position where it can read the original to the third reading position 1012, and is stopped (step S1503).

Next, the light emitting section 21 of the image reading unit 100 is extinguished (step S1505). Of course, if the light emitting section 21 is not lighted, it is not necessary to extinguish the light emitting section 21.

Then, a signal value output from the image reading unit 100 when it reads the white reference member 101 in an extinguished state of the light emitting section 21 is stored in a black reference data-storing area of the image memory 804 as black reference data for shading correction (step S1506).

Next, the light emitting section 21 of the image reading unit 100 is lighted (step S1507).

Then, the signal value output from the image reading unit 100 when it reads the white reference member 101 in a lit state of the light emitting section 21 is stored in a white reference data-storing area of the image memory 804 as white reference data for shading correction (step S1508).

Next, the CPU 801 determines whether or not comparative white reference data is stored in the image memory 804, which is used for determination of whether or not the white reference member 101 is soiled (step S1509). The comparative white reference data is data obtained by reading the white reference member 101 when the shading correction process is executed for the first time after factory shipment.

If it is determined in the step S1509 that the comparative white reference data is not stored (NO to the step S1509), the CPU 801 proceeds to the step S1510, wherein the white reference data stored in the step S1508 is stored as the comparative white reference data in a comparative white reference data-storing area of the image memory 804, and the CPU 801 proceeds to the step S1513.

On the other hand, if it is determined in the step S1509 that the comparative white reference data is stored (YES to the step S1509), the CPU 801 proceeds to the step S1511, wherein the white reference data stored in the step S1508 and the comparative white reference data are compared with each other to thereby determine whether or not the white reference member 101 is soiled (step S1511). A method of determining whether or not the white reference member 101 is soiled will be described hereinafter.

If it is determined in the step S1511 that the white reference member 101 is not soiled (NO to the step S1511), the CPU 801 proceeds to the step S1513.

On the other hand, if it is determined in the step S1511 that the white reference member 101 is soiled (YES to the step S1511), the comparative white reference data is set as the white reference data for calculation of the shading correction coefficient (step S1512). As described above, the image data obtained by reading the white reference member 101 by the image reading unit 100 and the reference data for performing shading correction (comparative white reference data) are compared with each other. If it is determined by the comparison that the white reference member 101 is soiled, shading correction is performed using the comparative white reference data.

Next, as described hereinabove with reference to FIGS. 13A and 13B, from the white reference data of each pixel, the black reference data of the corresponding pixel is subtracted. Then, shading correction coefficients for normalizing respective values obtained by the above-mentioned subtraction such that they become a maximum value of the image data are calculated (step S1513), and the calculated shading correction coefficients are stored in a shading correction coefficients-storing area of the image memory 804.

Then, the image reading unit 100 is rotated to the position where it can read the original and is stopped, the original G is conveyed to the location of the image reading unit 100 (step S1514A), and then reading of the original is executed (step S1514B). Next, the shading correction coefficients calculated in the step S1513 are read from the shading correction coefficient-storing area of the image memory 804, and shading correction is performed on the signal value of each pixel of the image data read by the image reading unit 100 (step S1515), followed by terminating the present process. The step S1515 corresponds to the function of a correction unit configured to perform shading correction using image data obtained by reading the white reference member using the reading unit.

As shown in FIG. 14, in a case where the image reading unit 100 is in one of the first reading position and the second reading position and reads the original in the one of the first and second reading positions, the image reading unit 100 is once rotated to the third reading position to calculate shading correction coefficients, and is then returned to the one of the first and second reading position to read the original, whereafter image data obtained by reading the original is subjected to shading correction using the calculated shading correction coefficients. Further, in a case where the image reading unit 100 is in one of the first reading position and the second reading position and reads the original in the other of the first and second reading positions, shading correction coefficients are calculated when the image reading unit 100 is in the third reading position halfway through rotation of the image reading unit 100 from the one to the other of the first and second reading positions, and then the image reading unit 100 reads the original, whereafter image data obtained by reading the original is subjected to shading correction using the calculated shading correction coefficients.

Figure 15A:
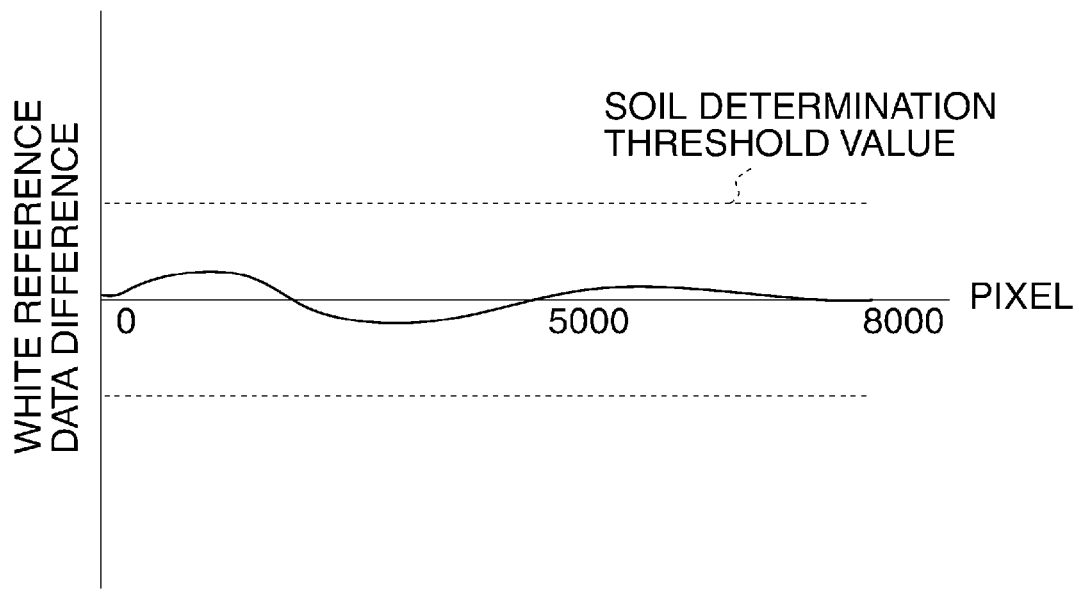
FIGS. 15A and 15B are diagrams showing examples of a difference between comparative white reference data stored in an image memory and white reference data.
Figure 15B:
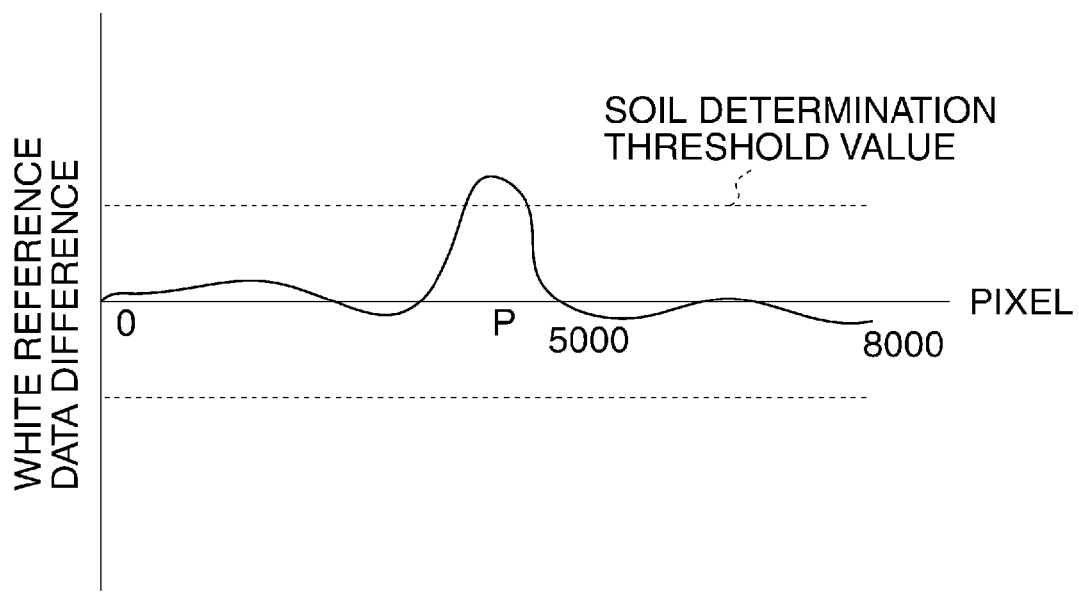

FIGS. 15A and 15B are diagrams showing examples of a difference between the comparative white reference data stored in the image memory 804 and the white reference data.

In FIGS. 15A and 15B, dotted lines each indicate a soil determination threshold value for use in determining whether or not the white reference member 101 is soiled, and it is assumed that the number of pixels is 8000.

FIG. 15A shows an example of a case where it is determined that the white reference member 101 is not soiled. In FIG. 15A, all the pixels show that the difference is lower than the soil determination threshold value.

FIG. 15B shows an example of a case where it is determined that the white reference member 101 is soiled. In FIG. 15B, pixels in the vicinity of a pixel P show that the difference is larger than the soil determination threshold value.

As described above, whether or not the white reference member 101 is soiled is determined by checking whether or not the difference between the comparative white reference data and the white reference data is smaller than the soil determination threshold value.

In the above-described embodiment, shading correction is performed whenever the reading operation is executed. For example, in a case where an original is read by changing the state (position) of the image reading unit 100 from the state (first reading position) shown in FIG. 10A through the state (third reading position) shown in FIG. 10C to the state (second reading position) shown in FIG. 10B, it is possible to perform the shading correction. Further, also in a case where an original is read by changing the state (position) of the image reading unit from the state (second reading position) shown in FIG. 10B through the state (third reading position) shown in FIG. 10C to the state (first reading position) shown in FIG. 10A, it is possible to perform the shading correction. Further, in a case where single-sided reading is performed, it is possible to perform shading correction when the state (position) of the image reading unit 100 is changed from the state (second reading position) shown in FIG. 10B through the state (third reading position) shown in FIG. 10C to the state (second reading position) shown in FIG. 10B. In short, it is possible to perform shading correction whenever a page of each original is read, to thereby improve the quality of the read image. However, the present invention is not limited to this, but shading correction may be performed only when the power is switched on, or may be performed whenever a predetermined period of time elapses. Further, shading correction may be performed before starting to read a bundle of originals, without between pages of the originals, to thereby reduce load on the CPU 801. Further, shading correction may be performed when the image reading unit 100 passes the white reference member 101.

As described above, in the present embodiment, the white reference member 101 is disposed at a location associated with the third reading position from which the image reading unit 100 can read the white reference member 101 while the image reading unit 100 rotates from one of the first reading position and the second reading position to the other. Further, by performing shading correction using the white reference member 101 arranged in the above-mentioned manner, it is possible to efficiently perform shading correction.

Further, the shared conveying path 80 serves both as a conveying path for conveying a recording material on which an image is to be formed and a conveying path for conveying an original. This makes it possible to provide the image forming apparatus 1 which is inexpensive, capable of performing printing during reading of an original, and further capable of reducing reading time.

Further, by arranging the white reference member 101 on a path along which the image reading unit 100 is rotated, it is possible to provide the image forming apparatus capable of efficiently performing shading correction during reading of both sides of an original. Further, it is possible to prevent soil of the white reference member 101 from causing an abnormality in the shading correction process, which makes it possible to prevent generation of defective images.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-105993, filed May 7, 2012, which is hereby incorporated by reference herein in its entirety.

What is claimed is:

1. An image reading apparatus comprising:
a reading unit configured to be rotatable for reading an original;
a control unit configured to cause said reading unit to read, by causing said reading unit to rotate after reading an image of the original, a reference member for use in shading correction; and
a correction unit configured to perform the shading correction using a read result of the reference member,
wherein said control unit causes said reading unit to read the reference member, after said reading unit in a first orientation reads an image on a first surface of the original and before said reading unit is rotated to a second orientation for reading a second surface of the original.

2. The image reading apparatus according to claim 1, wherein said control unit further causes said reading unit to read the reference member, by causing said reading unit to rotate before said reading unit reads a next original, after said reading unit in the first orientation reads the image on the first surface of the original.

3. The image reading apparatus according to claim 1, wherein the read result of the reference member is white reference data.

4. The image reading apparatus according to claim 1, further comprising a printing unit configured to print an image on a sheet, and
wherein said printing unit conveys the sheet via a conveying path to be used for reading the first surface of the original by said reading unit in the first orientation.

5. A method of controlling an image reading apparatus including a reading unit configured to be rotatable for reading an original, comprising:
causing the reading unit to read, by causing the reading unit to rotate after reading an image of the original, a reference member for use in shading correction; and
performing the shading correction using a read result of the reference member,
wherein the reading unit is caused to read the reference member, after said reading unit in a first orientation reads an image on a first surface of the original and before said reading unit is rotated to a second orientation for reading a second surface of the original.

6. A non-transitory computer-readable storage medium storing a computer-executable program for causing a computer to execute a method of controlling an image reading apparatus including a reading unit configured to be rotatable for reading an original,
wherein the method comprises:
causing the reading unit to read, by causing the reading unit to rotate after reading an image of the original, a reference member for use in shading correction; and
performing the shading correction using a read result of the reference member,
wherein the reading unit is caused to read the reference member, after said reading unit in a first orientation reads an image on a first surface of the original and before said reading unit is rotated to a second orientation for reading a second surface of the original.

7. An image reading apparatus comprising:
a rotatable reading unit configured to read an image;
a first conveying path configured to convey a sheet along the first conveying path;
a second conveying path configured to convey the sheet along the second conveying path;
a reference member used for shading correction; and
a control unit configured to cause the reading unit to rotate to a first reading position where the reading unit faces the first conveying path, to rotate to a second reading position where the reading unit faces the reference member, and to rotate to a third reading position where the reading unit faces the second conveying path.

8. The image reading apparatus according to claim 7, wherein the reference member is disposed between the first conveying path and the second conveying path.

9. The image reading apparatus according to claim 8, wherein the reading unit does not face the first conveying path or the second conveying path when positioned at the second reading position.

* * * * *